Patented Oct. 13, 1942

2,298,948

UNITED STATES PATENT OFFICE 2,298,948

METHOD OF PRODUCING FINELY DIVIDED MATERIAL

Humboldt W. Leverenz, South Orange, N. J., assignor to Radio Corporation of America, a corporation of Delaware No Drawing. Application January 18, 1941, Serial No. 375,026

10 Claims. (Cl. 250—81)

My invention relates to the subdivision of solid chemical compounds and is particularly directed to a method whereby small particles of compositions of matter may be obtained and more particularly to a method of manufacturing very small particles of controlled physical size to less than one micron.

Various methods of subdividing solid compositions of matter are known and usually such methods as grinding, chemical precipitation and sparking in an electrolyte have been used, but such processes result in particle sizes which are large and non-uniform as to size in contrast with materials subdivided in accordance with my invention by which I am able to produce very small particles even down to molecular subdivision. In the preparation of pigments for paints it is desirable to provide smallest possible particle size of the pigment particles to obtain high covering power when the pigment is mixed with a liquid vehicle. It is likewise desirable in many applications to provide finely divided materials of substantially uniform particle size. Thus, materials prepared by the above prior art methods are subdivided to varying degrees so that the resultant product contains materials of widely varying particle size. Furthermore, while my invention is not particularly directed to the manufacture of luminescent materials, it is still nevertheless applicable to such manufacture in that various luminescent materials may be subdivided by my new method of subdividing solid compositions of matter.

It is an object of my invention to provide material in a very finely divided state; it is also an object to provide a method whereby a solid composition of matter may be produced in a state of very fine subdivision; and it is a still further object to provide a method whereby the particle size of finely divided materials may be controlled and to provide a substantially uniform particle size throughout the mass of the produced material. Other objects of my invention are to provide a method whereby materials ideally suited for the preparation of luminescent materials may be treated to obtain uniform and controlled particle size as well as a method by which materials may be subdivided and subsequently treated to improve or modify the luminescent properties utilizing the advantages of small and/or uniform particle size of the material.

In accordance with my invention I dissolve the solid composition of matter, such as a chemical compound, hereinafter referred to as solute, in a solvent or mixture of solvents, which are normally solids at a normal temperature, by heating the solid and solvent to an elevated temperature following which I quench the solution and subsequently dissolve the solvent from the quenched solution by the use of a second solvent. The second solvent is thus utilized to leach the first solvent from the solution leaving the solute in finely divided form. It will be obvious that while I have described the above principle of my method referring to solvents which are normally solids at normal temperature, my invention is not limited to ordinary material solid at room temperature. Thus, the solvent may be solid only at reduced temperatures such as many degrees below 0° C. and dissolving the solute while the solvent is in liquid form followed by quenching to a reduced temperature and leaching the solid solvent from the solid solution utilizing a second solvent. Further, in accordance with my invention, I control the particle size of the composition of matter to be subdivided by controlling the rate at which the solution containing the material or solute is quenched as well as by controlling the proportions of solute to solvent.

The principal teaching of my invention is to dissolve the material to be finely divided in a solvent, which is either normally solid at room temperature or which may be solidified by reducing the temperature, by adding the solute either prior to or following the liquefaction of the solvent. The solute is dispersed throughout the solvent in substantially molecular subdivision, and I then quickly solidify the solution in order to preserve the solute in the dispersed state. By selectively removing the solvent, the solute remains as a mass of exceptionally small particles approaching the state of subdivision in the solvent. The particle size of this mass may be controlled by varying the proportion of solute to solvent and by varying the rate at which the solution is quenched.

As an example of my invention, zinc oxide, such as used for pigments, may be mixed with potassium hydroxide as a solvent which is then heated to above the melting point of the solvent to dissolve the zinc oxide as a solute in the potassium hydroxide as a solvent. The material to be finely divided such as zinc oxide becomes dispersed in practically molecular subdivision throughout the liquid solvent and upon rapid cooling, such as by quenching, is retained in the state of very fine subdivision, the particle size being susceptible of control by varying the rate of cooling or quenching. For the particular solution described above, I prefer to use water at room temperature as the quenching medium and I have found that the faster the solution is quenched, the smaller is the resultant particle size. The zinc oxide-potassium hydroxide solution may be quenched from a temperature of 300° C. to 800° C., the higher the temperature difference between the solution and the quenching medium, the smaller the resulting particle size. This rate of quenching may be increased by quenching the solution in thin sheets or threads to insure quick solidification of the solution. To further increase the rate of quenching and consequently decrease the particle size, the solution may be quenched from a temperature considerably above the melting point of the solvent. It is very desirable especially if water is to be used as the quenching or cooling medium that the solvent and solute should be several hundred degrees centigrade above the temperature of the water.

Following the quenching or rapid cooling of the solution, the material, such as zinc oxide, to be finely subdivided is removed from the solid solution by leaching away the solvent. The leaching operation may be performed by the use of a second solvent which in the example given may be water, leaving the subdivided material undissolved by the second solvent and in finely divided form. The second solvent is so chosen as to be substantially incapable of dissolving the solute, which dissolves only in the first solvent.

A further example embodying the use of my new method is in the manufacture of finely divided zinc sulphide which may be mixed with sodium chloride as a solvent which is heated to above the melting point of the mixture to dissolve the zinc sulphide in the chloride followed by rapid cooling or quenching and the leaching of the solidified solvent by a second solvent such as water retaining the finely divided zinc sulphide. I have obtained somewhat superior results with a mixture of sodium chloride and potassium sulphide preferably of the polysulphide type, in the proportion of 40% sodium chloride to 60% potassium sulphide by weight. A larger amount and up to 10% by weight of zinc sulphide may be dissolved in such a mixed solvent. In preparation of finely divided zinc sulphide the solution may be quenched from approximately 800° C. in water, using water to leach the solid solvent from the zinc sulphide leaving the sulphide particles in very finely divided form.

While I do not wish to be limited by an explanation why I prefer the use of a polysulphide solvent, I believe from the results of my tests that a solvent comprising or containing an ingredient having an element or radical in common with an element or radical of the solute produces superior results. The action of the solvent ingredient appears to control the chemical equilibrium during solvation to the extent that non-reversible decomposition of the solute is minimized. Thus the solvent preferably contains a chemical constituent, preferably in excess, in common with a constituent of the solute to prevent excessive irreversible decomposition of the solute. A monosulphide provides only one ionizable atom of sulphur for each molecule of the solvent sulphide whereas a polysulphide, such as the potassium polysulphide referred to in the above example, provides a multiple number of ionizable atoms of sulphur, this multiple depending on the combining ratio of the sulphur to the metal of the polysulphide. Thus the contribution of ions to obtain ionic equilibrium in the solution by the polysulphide solvent is considerably greater than the contribution of ions from the solute, and consequently, fewer molecules of the solute are dissociated, and as a result, non-reversible decomposition of the solute is minimized.

Another example is the preparation of finely divided cadmium oxide. This oxide may be dissolved in borax and quenched in water from a temperature of approximately 300° C., water being utilized as the second solvent to leach the borax from the finely divided cadmium oxide.

In subdividing this and other oxides I prefer to use a solvent which limits excessive irreversible decomposition of the solute. Peroxides of sodium and barium may be used as constituents of the solvents.

To those skilled in the art of preparing luminescent materials it will be apparent that zinc sulphide, referred to particularly in one of the examples above, is a well known luminescent phosphor and may be either of the activated or non-activated type. In the preparation of some luminescent materials it is customary to utilize a metal activator such as manganese, silver, copper, or other metal which considerably increases the luminescent efficiency of the phosphor. My invention is applicable to the subdivision of either unactivated or activated luminescent materials. Thus zinc sulphide activated by copper or a copper compound, such as copper sulphide, may be subdivided by dissolving the zinc sulphide and activating compound in sodium chloride or the mixture of sodium chloride and potassium sulphide referred to above, followed by rapid quenching of the solution and leaching the solvent by a second solvent such as water. It is believed that during the quenching of the solution containing an activated solute the precipitation and/or recrystallization of the very fine substantially molecular particles of the solute and the activating metal or metal compound occur at substantially the same rates so that the ratio of phosphor material to the activator material of the final subdivided product is substantially unaltered.

The advantages of my invention in providing small particle size and uniform particle size may be utilized in subdividing materials which are subsequently recrystallized for use in applications using phosphor materials. Thus, subdivided materials such as zinc sulphide may be recrystallized at temperatures of 850 to 1300° C., with or without the introduction of an activator to improve the luminescent properties of the materials. Such recrystallization may be performed by floating the finely divided material in a hot gaseous atmosphere thereby recrystallizing the material in the finely divided form without sintering the particles together. The luminescent properties of the material are thus improved without materially increasing the size of the material particles.

While I have described the method of my invention with particular reference to sulphides and oxides and to certain sulphide phosphors, both of the activated and non-activated type, it will be appreciated that my invention is not limited to the particular materials described but that it embraces dissolving a substance thereby dispersing it in practically molecular subdivision, then quickly solidifying the solution in order to preserve the dispersed state of the solute, and then selectively removing the solvent retaining the solute as a mass of exceptionally small particles. Therefore, I do not restrict the method of my invention for use with the particular materials described in the various examples given, it being appreciated that my invention is susceptible of use with a wide variety of materials and my invention is not limited except as set forth and so limited in the appended claims.

I claim:

1. The method of preparing finely divided luminescent material which comprises the steps of dispersing the material by solvation in a solvent containing an ingredient having an element or radical in common with an element or radical of the said material, the ingredients of said solvent being normally solid at predetermined temperatures, dispersing a luminescent activator in said solvent, suddenly solidifying the solution to recrystallize the said material combined with the luminescent activator in finely divided form throughout the solidified solution, removing the solvent from the solid solution to recover the material combined with the said activator in finely divided form and treating the material with the combined activator by a heating process to improve the luminescent properties of the material.

2. The method of subdividing into small particles a luminescent material having an activator incorporated therein comprising dissolving a luminescent material activated by a metal compound in a liquid solvent normally solid at a predetermined temperature to distribute the material and activating compound throughout the solvent, quenching the solution at a rate at which recrystallization of said material and said compound occur at substantially the same rates to form a solid solution, dissolving the said solvent by a second solvent to obtain finely divided activated luminescent material and heating the material to redistribute the activating compound within the material and to increase its luminescent properties without materially increasing the size of particles of said material.

3. The method of preparing a finely divided activated phosphor which comprises dispersing a phosphor base material in a solvent capable of being solidified at a predetermined temperature, dispersing a phosphor activator in said solvent, quenching the said solvent and the dispersed materials at a rate at which the phosphor base material and phosphor activator are crystallized at substantially the same rates and removing the crystallized materials from said solvent.

4. The method of preparing finely divided luminescent material comprising dissolving a luminescent base material as a partial solute in a solvent normally solid at a predetermined temperature by heating the solvent to an elevated temperature, dissolving a luminescent activator as the remaining solute in said solvent, quenching said solvent at a rate sufficiently rapid to produce co-crystallized particles of the base material and activator, separating the said particles from the solvent, firing the said particles at an elevated temperatures to improve the luminescent properties of said particles and simultaneously maintaining contact between said particles at a minimum to prevent crystal growth.

5. The method of intimately combining a phosphor base material and a phosphor activator comprising dissolving a phosphor base and a phosphor activator in a liquefied solvent normally solid at a predetermined temperature and rapidly solidifying said solvent to crystallize said phosphor base and said phosphor activator together.

6. The method of preparing a sulphide phosphor comprising dissolving the sulphide phosphor as a solute in a polysulphide solvent to minimize the nonreversible decomposition of the sulphide phosphor, quenching the solvent and solute to recrystallize the sulphide phosphor and leaching the solvent from the solid solution, leaving the solute phosphor in finely divided form.

7. The method of preparing an activated zinc sulphide phosphor comprising dissolving zinc sulphide and an activator as solutes in a polysulphide solvent to minimize the nonreversible decomposition of said zinc sulphide, quenching the solute containing solvent to form particles of zinc sulphide and activator, and leaching the solvent from the particles, leaving the particles in finely divided form.

8. A solid luminescent material and an activator in a solid solvent capable of being leached away from said solid luminescent material.

9. A solid luminescent sulphide material and an activator in a solid polysulphide solvent capable of being leached away from said solid luminescent material.

10. A solid luminescent sulphide material in a solidified polysulphide solvent capable of dissolving the said sulphide when in a liquefied state, said solvent being capable of being leached away from said solid material.

HUMBOLDT W. LEVERENZ.